United States Patent

Irino et al.

Patent Number: 5,145,753
Date of Patent: Sep. 8, 1992

[54] SOLID ELECTROLYTE FUEL CELL

[75] Inventors: Mitsuhiro Irino; Tetsuo Gora; Masaharu Minami; Hitoshi Miyamoto; Masao Sumi, all of Takasago; Nobuyoshi Tomita, Kobe; Kiyoshi Watanabe, Kobe; Kazumi Ogura, Kobe; Masanori Nishiura, Kobe; Masayuki Funatsu, Kobe; Kazuhiro Yoshimoto, Kobe; Koichi Takenobu, Kobe; Tokuji Satake, Kobe, all of Japan

[73] Assignee: Mitsubishi Jukogyo Kabushiki Kaisha, Tokyo, Japan

[21] Appl. No.: 578,499

[22] Filed: Sep. 6, 1990

[30] Foreign Application Priority Data

Sep. 12, 1989 [JP] Japan ................................. 1-236459
Nov. 13, 1989 [JP] Japan ................................. 1-294483

[51] Int. Cl.5 ........................ H01M 8/12; H01M 4/86
[52] U.S. Cl. ........................................ 429/32; 429/36; 429/40
[58] Field of Search ................... 429/30, 32, 36, 38, 429/40

[56] References Cited

U.S. PATENT DOCUMENTS

| | | | |
|---|---|---|---|
| 4,510,212 | 4/1985 | Faioli | 429/30 |
| 4,666,798 | 5/1987 | Herceg | 429/32 X |
| 4,799,936 | 1/1989 | Riley | 429/30 |
| 4,857,420 | 8/1989 | Maricle et al. | 429/32 X |
| 4,997,726 | 3/1991 | Akiyama et al. | 429/30 |

FOREIGN PATENT DOCUMENTS

| | | |
|---|---|---|
| 289226 | 11/1988 | European Pat. Off. . |
| 0338823 | 10/1989 | European Pat. Off. . |
| 338823 | 10/1989 | European Pat. Off. . |
| 355420 | 2/1990 | European Pat. Off. . |
| 0355420 | 2/1990 | European Pat. Off. . |
| 2747467 | 2/1979 | Fed. Rep. of Germany . |
| 2294244 | 7/1976 | France . |
| 62-76262 | 4/1987 | Japan . |
| 62-131479 | 6/1987 | Japan . |
| 62-133677 | 6/1987 | Japan . |
| 62-184772 | 8/1987 | Japan . |
| 62-245867 | 10/1988 | Japan . |
| 1-41172 | 2/1989 | Japan . |
| 1-197971 | 8/1989 | Japan . |
| 1-206567 | 8/1989 | Japan . |
| 1-227362 | 9/1989 | Japan . |

Primary Examiner—Stephen Kalafut
Attorney, Agent, or Firm—Fleit, Jacobson, Cohn, Price, Holman & Stern

[57] ABSTRACT

A noble solid electrolyte fuel cell includes a generating layer (5), an interconnector layer (9), and a support layer (10) disposed between the generating and interconnector layers. The interconnector layer comprises a fuel electrode (6), an interconnector material (7) and an oxygen electrode (8). The support layer (10) forms a fuel passage and an oxidizer passage, and supporting rods (15, 102) for gas sealing are disposed at both ends of the support layer. A sealing film (110) is cemented to the contact surfaces of the supporting rods (15, 102) between the generating layer and the interconnector layer, and this sealing film becomes soft or half melted during the operation of the fuel cell. This construction provides improved cell performances due to better sealing of gases even under large temperature differences. The use of finer particles near the surface of the solid electrolyte only is also disclosed.

19 Claims, 12 Drawing Sheets

SOLID ELECTROLYTE FUEL CELL

BACKGROUND OF THE INVENTION

The present invention relates to a solid electrolyte fuel cell. More specifically, it relates to a solid electrolyte fuel cell of flat plate type which operates at high temperatures and can absorb and withstand the thermal expansion of its components at such temperatures. Also, it relates to a solid electrolyte fuel cell in which a thin layer of fine particles is disposed on the side of the oxygen electrode and/or the fuel electrode which side is in contact with the solid electrolyte.

Figure 7:
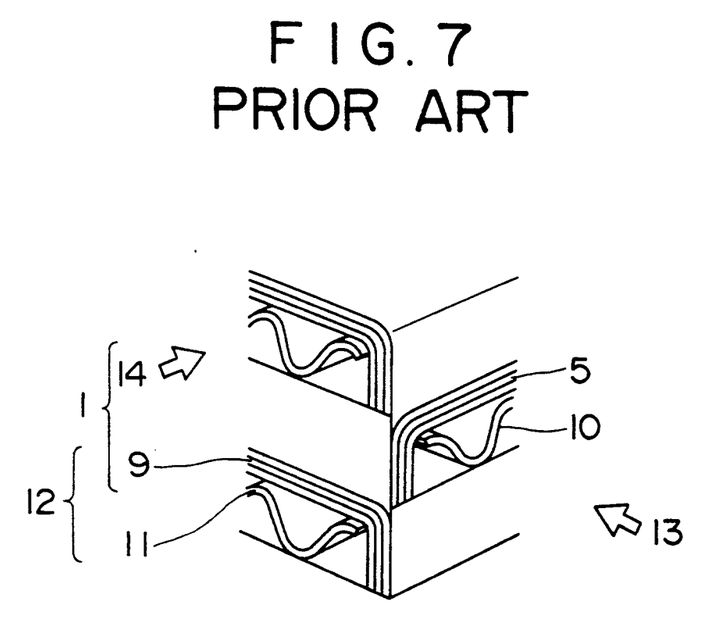
FIG. 7 shows a conventional gas sealing mechanism.

A conventional flat plate type solid electrolyte fuel cell is shown in FIG. 7.

In FIG. 7, numeral 12 indicates a module which is made by piling a plurality of unit cells 1. The unit cell 1 comprises a generating layer 5, a support layer 10 on the fuel side, a support layer 11 on the oxidizer side, and an interconnector layer 9. These elements are piled up and sintered.

This type of conventional solid electrolyte fuel cells have the following problems.

(a) As shown in FIG. 7, the support layer 10 on the fuel side and the support layer 11 on the oxidizer side are arranged perpendicularly with respect to each other so that the fuel 13 ($H_2$, CO, etc.) and the oxidizer 14 (air, $O_2$, etc.) do not mix. For the separation of the gases, the generating layer 5 and the interconnector layer 9 are bent at the side portions of the module 12 so that the generating layer 5 is connected to the interconnector layer 9 and the interconnector layer 9 is connected to the generating layer 5 for gas sealing. Since the generating layer 5 and the interconnector layer 9 are only about 100–200 μm in thickness, the gas sealing is not as good as it should be, and the fuel 13 and the oxidizer 14 tend to mix, degrading the cell performance.

(b) The module 12 is formed by piling up unit cells 1. The weight of the module 12 is supported by the support layer 10 on the fuel side and the support layer 11 on the oxidizer side. These support layers are thin ceramics films whose thickness is about 100 μm and have a certain limitation on the piling up of layers because of their fragility.

(c) When an interconnector 101 and a supporting rod 102 and an electrolyte film 103 are simply sintered or cemented together using an adhesive, because of differences in the linear expansion coefficient of the components, each component becomes subjected to large thermal stress. Cracks thus form in the electrolyte film 103, which is to separate a fuel gas 108 and an oxidizer gas 109 completely and which functions as a solid electrolyte. As a result, the two gases mix, and the power generating performance of the cell becomes considerably degraded.

Figure 16:
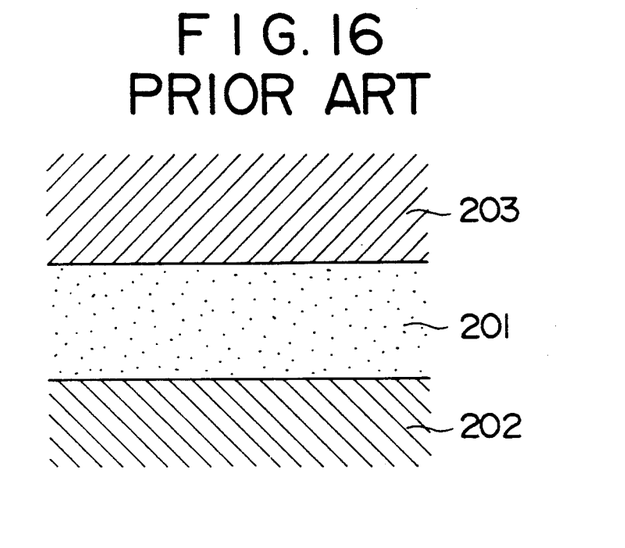
FIG. 16 shows a section of a conventional solid electrolyte fuel cell.

Furthermore, FIG. 16 shows an example of the conventional solid electrolyte fuel cell which comprises solid electrolyte 201, an oxygen electrode (positive pole) 202, and a fuel electrode (negative pole) 203.

Figure 17:
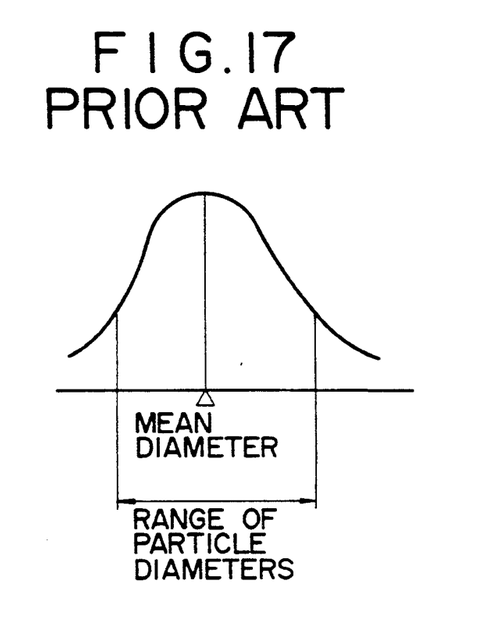
FIG. 17 shows the distribution of particle diameters for the fuel cell of FIG. 16.
Figure 18:
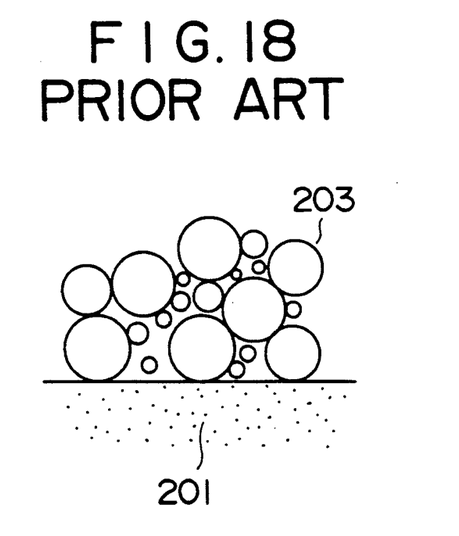
FIG. 18 shows an enlarge partial view of the same fuel cell.

In general, the particle diameter of the particles used in the oxygen and fuel electrodes is not adjusted when conventional fuel cells are manufactured. Therefore, as shown in FIG. 17, the particle diameter is distributed in a broad range which depends on the manufacturing method of the electrode particles. For example, if the mean diameter is 2 μm, the diameter ranges from about 0.2 to about 10 μm. As shown qualitatively in FIG. 18, the spaces between larger particles are filled by smaller particles, and therefore the diffusion of gas through the electrodes is impeded. Also, the effective contact area between the electrode particles and the solid electrolyte is disadvantageously small. As a result, the performance of the solid electrolyte fuel cell tends to be unnecessarily low.

BRIEF SUMMARY OF THE INVENTION

The present invention has been made in view of the above problems. An object of the present invention is to provide a solid electrolyte fuel cell which can solve the problems associated with faulty sealing caused by uneven thermal expansion of its components and also by certain structural weakness found in conventional solid electrolyte fuel cells. Another object of the present invention is to improve gas diffusion in solid electrolyte electrodes of a solid electrolyte fuel cell and increase the effective contact area between the electrode particles and the solid electrolyte so as to obtain superior cell performance.

The solid electrolyte fuel cell of the present invention can be summarized as follows.

(1) In a fuel cell comprising a generating layer, an interconnector layer, and a support layer disposed between the generating layer and the interconnector, the solid electrolyte fuel cell of the present invention is characterized in that the generating layer is a solid electrolyte sandwiched between a fuel pole and an oxygen pole, the interconnector layer comprises a fuel electrode and an interconnector material and an oxygen electrode, the support layer forms a fuel passage and an oxidizer passage above and below the generating layer, and supporting rods for gas sealing are disposed at both ends of the support layer.

(2) In a solid electrolyte fuel cell comprising a generating layer, an interconnector, and supporting rods disposed between the generating layer and the interconnector, the solid electrolyte fuel cell of the present invention is characterized in that the generating layer comprises a fuel pole, an oxygen pole, and a solid electrolyte film sandwiched between the two poles, the interconnectors and the generating layers form flow passages which cross perpendicularly to each other above and below each generating layer, a sealing film is cemented to the contact surface of the supporting rod between the connection portions of the generating layer and the interconnector, and the sealing film becomes soft or half melted during the operation of the fuel cell.

(3) The solid electrolyte fuel cell as described in (2) above is further characterized in that the sealing film is made and formed of a mixture of inorganic fiber which does not becomes soft even at 1000° C. and inorganic softening powder which becomes soft or half melt at about 1000° C.

(4) Also, the solid electrolyte fuel cell of the present invention comprises a solid electrolyte, a first thin layer which is in direct contact with the solid electrolyte and made up of at least one layer of oxygen electrode fine particles, an oxygen electrode which is placed on the first thin layer and which comprises a layer whose thickness is greater that the first thin layer and which is made of oxygen electrode particles whose diameter is larger than the oxygen electrode fine particles, and a fuel electrode disposed on the main surface of the solid electrolyte opposite from the oxygen electrode.

(5) The solid electrolyte fuel cell of the present invention comprises a solid electrolyte, a second thin layer which is in direct contact with the solid electrolyte and made up of at least one layer of fuel electrode fine particles, a fuel electrode placed on the second thin layer and comprising a layer whose thickness is greater than the second thin layer and which is made of fuel electrode particles whose diameter is larger than the fuel electrode fine particles, and an oxygen electrode disposed on the main surface of the solid electrolyte opposite from the fuel electrode.

The solid electrolyte fuel cell of the present invention as summarized above exhibits the functions and effects we shall explain below.

(i) The gas sealing surface can be larger as the width of the supporting rod is enlarged. In a conventional cell, the gas sealing surface has been provided only for the width of the generating and interconnector layers. The gas sealing surface whose width is about 200 μm has not been sufficient for good sealing. According to the present invention, the width of the supporting rod is about 5 mm so that the gas sealing surface is much greater and the gas sealing becomes improved.

(ii) Because the weight of the module is supported by the supporting rods which are arranged in parallel crosses in the module, the strength becomes improved and more unit cells can be piled up. The supporting rod of the present invention is stronger compared to a support film because it is an electrolyte body, such as a ceramic body.

(iii) Thermal expansion is no constrained because, while the sealing film is cemented to the supporting rod, the film is merely pressed against the interconnector and the electrolyte with a pressuring load for the sealing surfaces. Thermal stress is therefore very small and does not cause the electrolyte film to break.

(iv) The sealing film shows sufficient sealing effects with a small pressuring load. The sealing film is made of inorganic fiber which does not soften at operating temperature and inorganic softening powder which is a powder of a material which becomes soft at operating temperatures. In the sealing film during operation, the inorganic softening powder, now half melted, fills spaces left empty by the inorganic fiber, and the perfect sealing of gas can be achieved.

(v) In the present invention, as described in (4) and (5) above, fine particles placed on the interface between the electrodes and the electrolyte show the effects we shall describe below.

BRIEF DESCRIPTION OF THE DRAWINGS

The invention will now be described in detail with reference to the accompanying drawings, wherein.

DETAILED DESCRIPTION OF PREFERRED EMBODIMENTS

Figure 1:
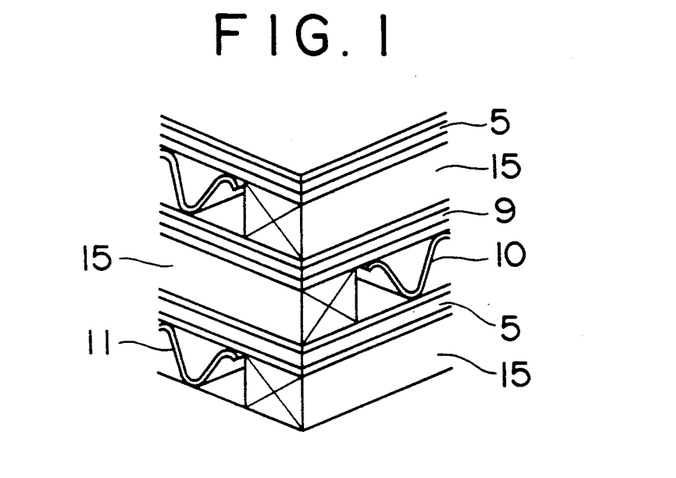
FIGS. 1 and 2 show a first embodiment of the present invention.
Figure 2:
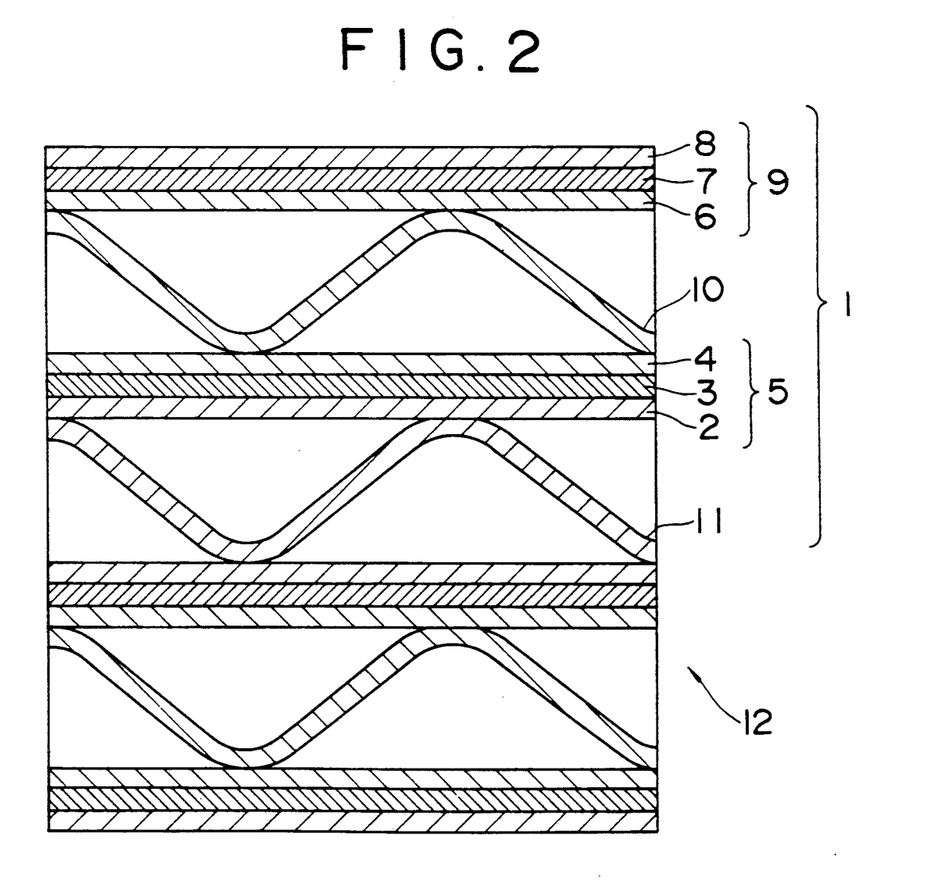

FIGS. 1 and 2 show a first embodiment of the present invention.

The generating layer 5 is prepared by baking a solid electrolyte film 3 made of yytria stabilized zirconia (called YSZ hereinafter) or the like at above 1300° C. and by spreading a fuel electrode 4 on one side of it and an oxygen electrode 2 on the other side and then baking it at above 1200° C. For fuel, a mixture of NiO and YSZ or the like can be used. For the oxygen electrode, LaSrMnO$_3$ or the like can be used.

The interconnector layer 9, which includes the fuel electrode 6 and the oxidizer electrode 8, is also prepared in the same manner. LaMgCrO$_3$ or the like can be used as the interconnector material 7.

The support layer 10 on the fuel side, which is made of the same materials as the fuel electrode, is cemented to the generating layer 5, and the supporting rods 15 are cemented at two ends of the generating layer. The interconnector layer 9 is cemented on top of this arrangement. Also, the support layer 11 on the oxidizer side and the supporting rods 15 are cemented to the generating layer 5 to form the unit cell 1. The module 12 is formed by piling up a plurality of the unit cells 1.

Figure 3:
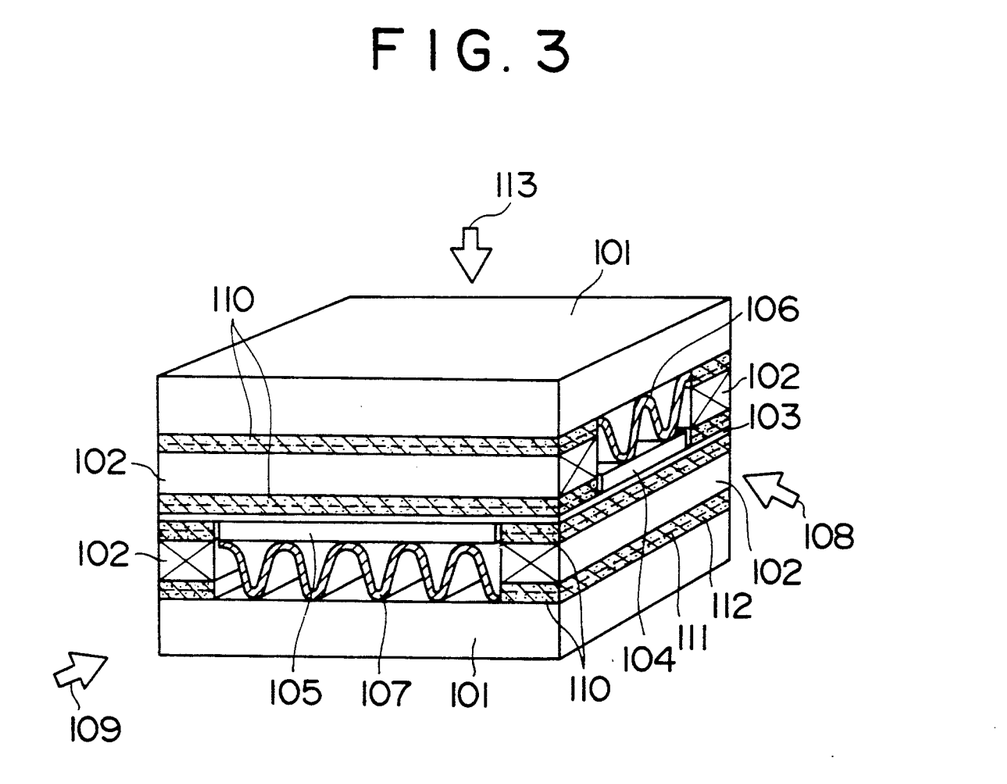
FIGS. 3 and 4 show a second embodiment of the present invention.

FIG. 3 shows a second embodiment of the solid electrolyte fuel cell of the present invention which uses sealing films and has wavy support films 106, 107. In this second embodiment, the sealing films 110 are first cemented to the top and the bottom surface of the supporting rod 102, and then the supporting rods 102 are disposed between the interconnector 101 and the solid electrolyte film 103. A weight is placed on the upper interconnector so that the pressuring load 113 of the sealing surfaces is applied. In this construction, when the operating temperature reaches about 1000° C., the inorganic softening powder 112 and the inorganic fiber 111 prevent the fuel and oxidizer gases from leaking through the sealing surfaces (between the interconnector and the sealing film and between the solid electrolyte film and the sealing surface) in the manner we shall describe in detail below. Also, excessive thermal stress of the solid electrolyte film 103 can be prevented because differences in the thermal expansion of the interconnector 101 and the solid electrolyte film 103 are absorbed by the slide of the sealing surfaces. In the drawing, numeral 104 indicates the fuel electrode and numeral 105 the oxygen electrode.

The table below shows the dimensions and linear expansion coefficients, etc. of the solid electrolyte fuel cell in FIG. 4. The size of the cell is 100 mm by 100 mm.

With the dimension and linear expansion coefficients and the structure noted in the table, when the components are cemented together, because the linear expansion coefficient of the interconnector is small compared to that of the other components, and because the interconnector is most rigid dimensionally, the solid electrolyte film 103 suffers thermal stress, as calculated below, due to differences in the linear expansion coefficients of the interconnector and the solid electrolyte film.

$$\delta YSZ = (\alpha YSZ - \alpha LMC) \cdot E \cdot \Delta T = (10.6 \times 10^{-6} - 9.8 \times 10^{-6}) \times 3.5 \times 10^4 \times 1000 = 28 \ (kg/mm^2),$$

where $\alpha$ is the linear expansion coefficient, E Young's modulus, and $\Delta T$ the temperature difference (assuming that cementing is done at 1000° C. and then the cell is cooled to 0° C.).

This stress is about 2.8 to 1.9 times larger than the allowable stress of 10–15 $kg/mm^2$ of the solid electrolyte film 103 and would cause the electrolyte film to break.

the resulting thermal stress is vary small and does not cause any injury to the solid electrolyte film 103.

Figure 4A:
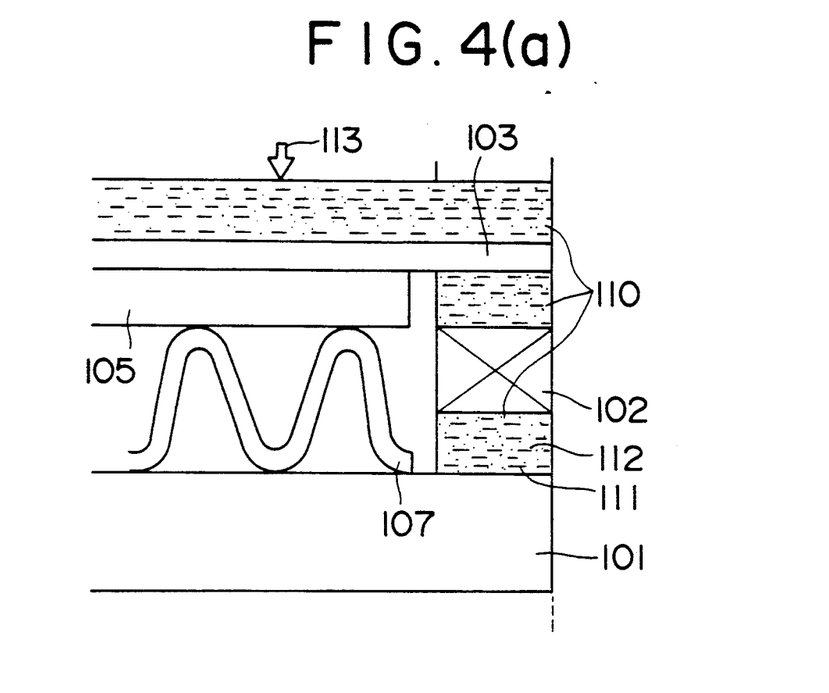
Figure 4B:
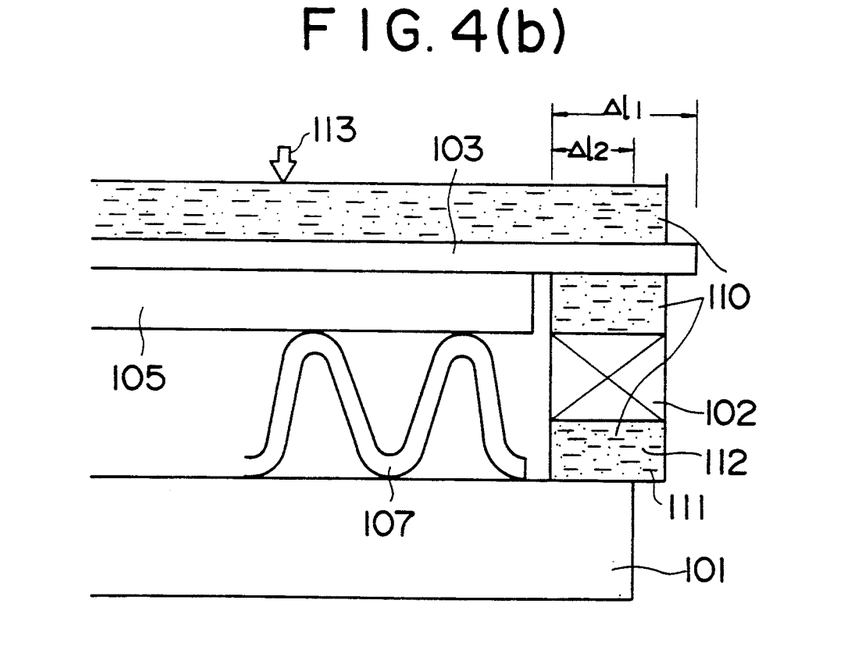

Also, the sealing film 110 of the present invention is made of the inorganic fiber 111 and the inorganic softening powder material 112 as shown in FIGS. 4(a) and 4(b) so that sealing effects can be achieved with a small load 113 onto the sealing surfaces. In this case, a fiber (0.1–1.0 $\mu$m in diameter and 10–50 $\mu$m in length) made of a material that does not become soft at around 1000° C., such as high silica glass, slug, and ceramics, is used for the inorganic fiber 111. The major component of the inorganic softening powder is a powder (0.1–10 $\mu$m in diameter) of a material which softens at about 1000° C., such as talc, kaolin, sepiolite, vermiculite, and mica. The fiber is 5–40% by weight and the powder is 30–95% by weight and the rest a binder, such as natural rubber, synthetic rubber, latex, and various pulps.

Thus, under the operating condition of 1000° C., the half-melted inorganic softening powder 112 fills up between the inorganic fiber 111 in the sealing film 110. The inorganic softening powder 112 in this half melted state also permeates the sealing surfaces (between the interconnector and the sealing film and between the solid electrolyte film and the sealing film) with the action of the load 113, and the gas sealing is secured. In the drawing, numeral 104 indicates the fuel electrode, numeral 105 the oxidizer electrode, numerals 106 and 107 the wavy support films.

Figure 5:
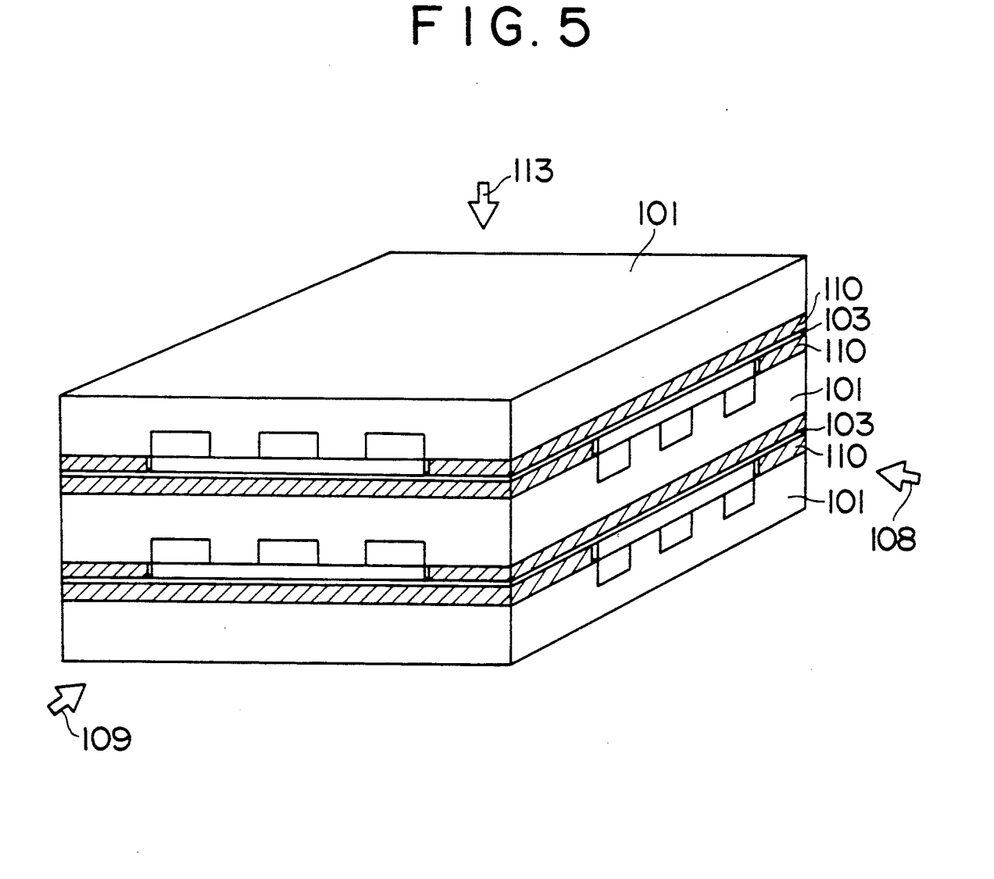
FIG. 5 shows a third embodiment of the present invention.

FIG. 5 shows a third embodiment of the present invention in which the sealing film is applied to the flat plate type solid electrolyte fuel cell having grooves. In this third embodiment, the sealing film 110 is directly inserted between the interconnector 101 and the solid electrolyte film 103. Also, numeral 108 indicates the fuel

TABLE

| | | Material | Linear expansion coefficient | Dimensions (mm) |
|---|---|---|---|---|
| 101 | Interconnector | LaMgCrO3 | $9.8 \times 10^{-6}$ | 2(thick) × 100(w), flat plate |
| 102 | Supporting rod | YSZ | $10.6 \times 10^{-6}$ | 8(w) × 1.5(h) × 100(1) |
| 103 | Solid electrolyte film | YSZ | $10.6 \times 10^{-6}$ | 0.2(thick) × 100(w), flat plate |
| 104 | Fuel electrode | NiO + YSZ | $12.8 \times 10^{-6}$ | 0.1(thick) × 80(w), flat plate |
| 105 | Oxygen electrode | LaSrMnO3 | $12.3 \times 10^{-6}$ | 0.1(thick) × 80(w), flat plate |
| 106 | Wavy support film on the fuel side | NiO + YSZ | $12.8 \times 10^{-6}$ | 0.3(thick) × 100(w), wavy plate Wave height 1.5, wave pitch 3 |
| 107 | Wavy support film on the O2 side | LaSrMnO3 | $12.3 \times 10^{-6}$ | 0.3(thick) × 100(w), wavy plate Wave height 1.5, wave pitch 3 |

Therefore, in the present invention, the sealing film for absorbing differences in the thermal expansion between the interconnector and the solid electrolyte film has been developed. Also, the sealing films are disposed between the interconnector 101 and the supporting rod 102 and between the solid electrolyte film and the supporting rod 102 so that thermal stress is moderated.

FIG. 4(a) is an enlarged view of the cell shown in FIG. 3 showing the positional relations between the sealing film 110 and the interconnector 101 and the solid electrolyte films 103 at room temperature. FIG. 4(b) shows the positional relations between the same components with thermal expansion during operation at 1000° C. The solid electrolyte film 103 has expanded by $\Delta l_1$, and the interconnector 101 has expanded by $\Delta l_2$. In the present invention, while the sealing film 110 is cemented to the supporting rod 102, the sealing films is only pressed against the interconnector 101 and the solid electrolyte film 103 by way of a load 113 for the sealing surface so that free thermal expansion is allowed. Thus gas, and numeral 109 the oxidizer gas.

Figure 6A:
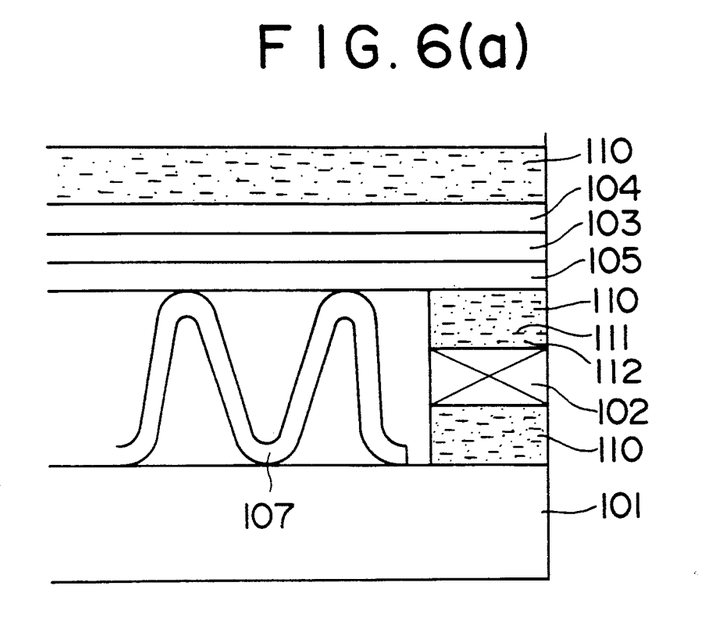
FIG. 6 shows a fourth embodiment of the present invention.
Figure 6B:
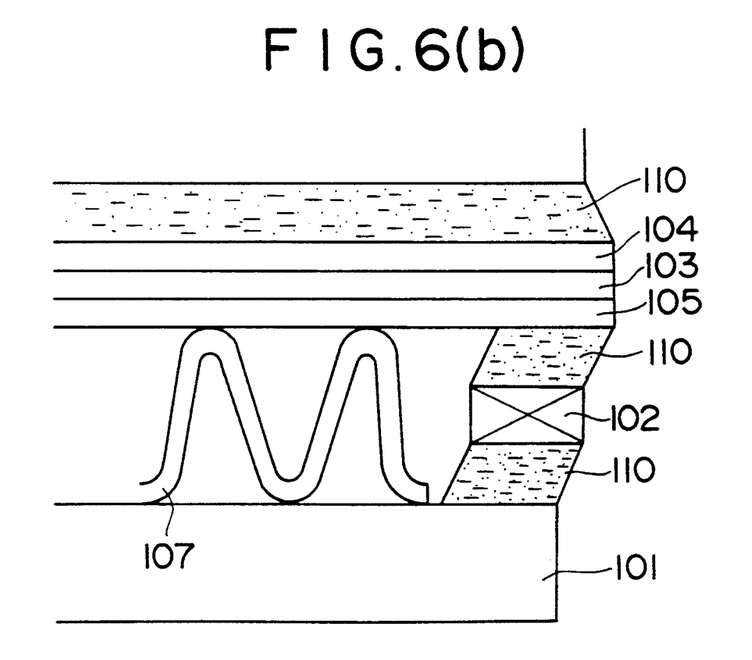

FIG. 6 shows a fourth embodiment of the present invention. FIG. 6(a) shows, at room temperature, the cell in which the sealing film 110 is also cemented onto the fuel and the oxygen electrode 104, 105 which are extended to the ends of the unit cell. FIG. 6(b) shows the positional relations between the components of FIG. 6(a) at a temperature of 1000° C. In FIG. 6(b), the interconnector 101 and the sealing film 110, the oxygen electrode 105 and the sealing film 110 as well as the fuel electrode 104 and the sealing film 110 are cemented to each other, and the section of the sealing film 110 deforms into a parallelogram shape. However, no excessive forces would act on the solid electrolyte 103 because the sealing film becomes soft or in a half-melted state at high temperatures, and because no reactive forces associated with the deformation occur.

The present invention as described in (1) to (3) above, can achieve the following effects.

The supporting rods are arranged at both ends of the support layer on the fuel side and of the support layer on the oxidizer side so that the leakage of the oxidizer to the fuel side and that of the fuel gas to the oxidizer side are prevented. The width of the supporting rods functions as a sealing surface, and the area of such a sealing surface is much greater than in conventional cells, improving the sealing.

In a conventional cell, the weight of the module has been supported by the support layer. This support layer, however, is made of thin film ceramics with about 100 $\mu$m thickness and does not have sufficient strength. Therefore, there has been a limit on the number of the unit cells which can be piled up. In the present invention, on the other hand, the strength is greatly improved because the weight is supported also by the supporting rods.

It is possible to reduce excessive thermal stress acting on the solid electrolyte film in a solid electrolyte fuel cell to nearly zero. Thus significant reductions in power output caused by cracks due to thermal stress can be avoided, and a flat plate type solid electrolyte fuel cell can be put in practical use.

We shall now explain another set of embodiments (experimental embodiments) of the present invention along with some comparative examples to show the solid electrolyte cell of the present invention as summarized in (4) and (5) above. As state above, the effects of fine particles placed on the interface between the electrode and the electrolyte will now be described. Because these effects are basically the same for the fuel (negative) and oxygen (positive) electrode, we shall explain them for the fuel electrode.

Figure 8:
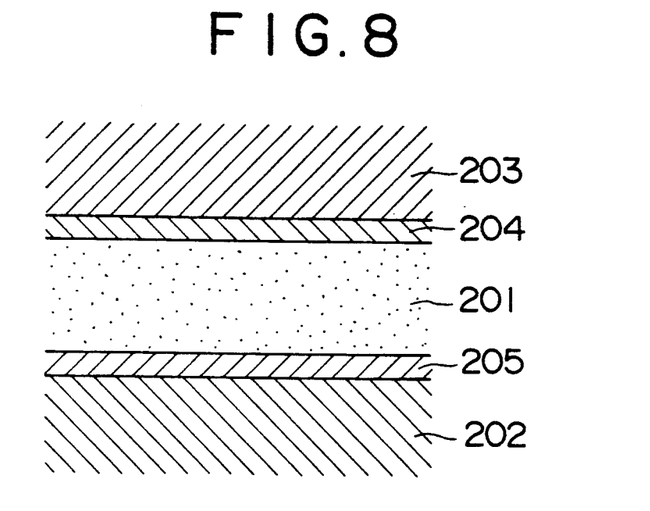
FIG. 8 shows a section of the solid electrolyte fuel cell of the present invention with fine particle thin layers on the solid electrolyte.
Figure 9:
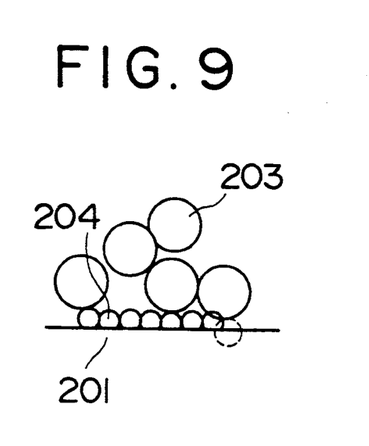
FIG. 9 shows an enlarged partial view of FIG. 8.
Figure 10:
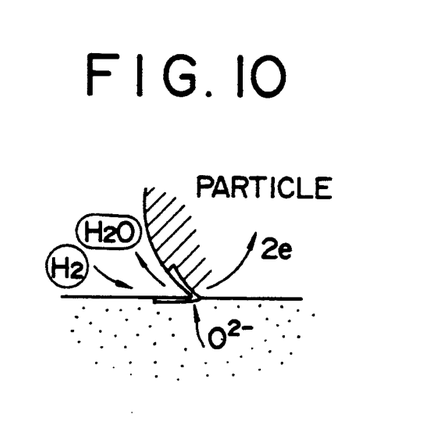
FIG. 10 shows a schematic diagram for explaining the working of the same fuel cell at a three-phase interface.

In FIGS. 8 and 9, the negative pole thin layer 204 (less than 4 $\mu$m in particle diameter) is disposed in contact with the solid electrolyte 201, and the fuel electrode 203 is placed on this thin layer. Because of this construction, as shown in FIG. 10, oxygen ions $O^{2-}$ which have passed through the solid electrolyte 201 release electrons at the three-phase interface and react with $H_2$ to produce water. The area of this three-phase interface becomes larger as the particle diameter becomes smaller. However, if the particle diameter is smaller, the supply of $H_2$ diminishes. Since this can result in a degraded cell performance, the present invention uses an electrode material with small particle diameters near the interface only and relatively large particles for the fuel electrode (thick layer portion) 203 and for the oxygen electrode (thick layer portion) 202 in order to improve the supply of gas. Also, numeral 205 indicates the positive pole thin layer.

Experimental Embodiment 1

Figure 11:
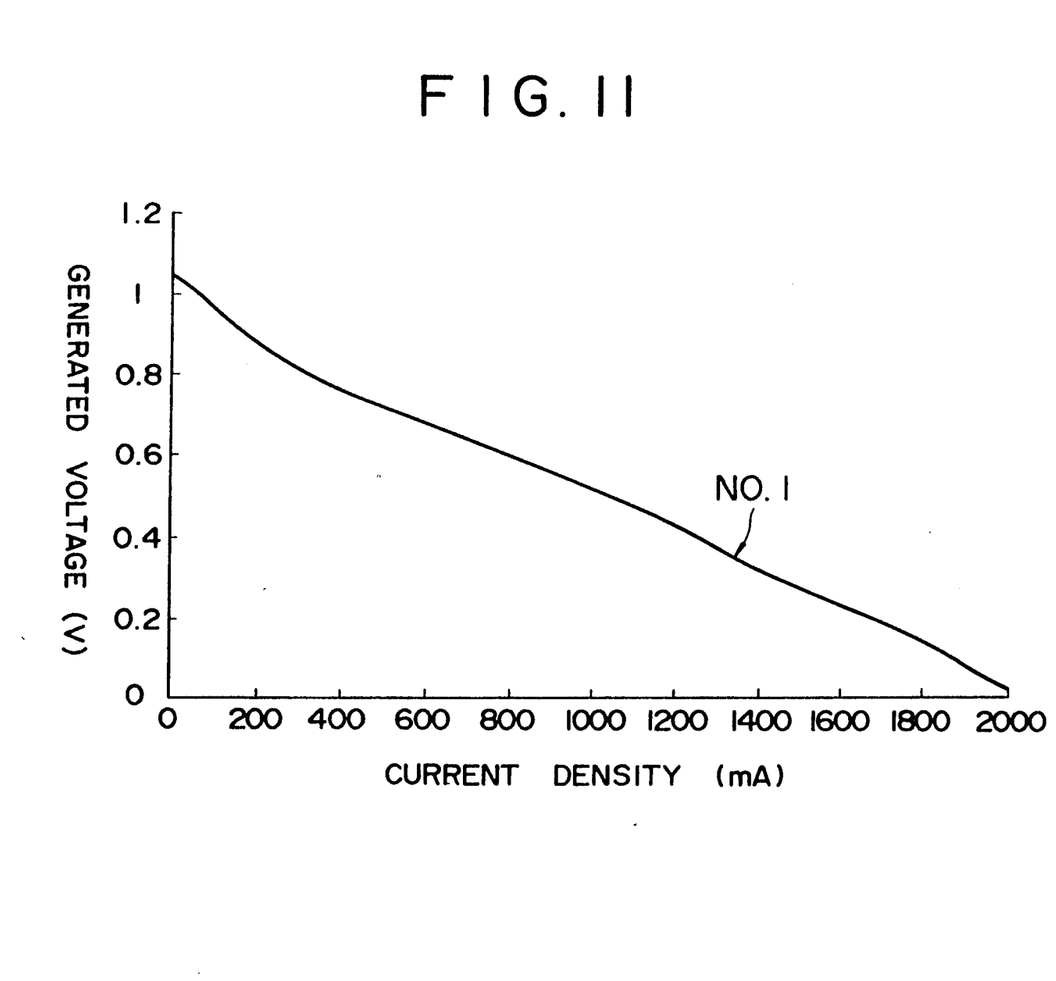
FIG. 11 shows the relation between the generated voltage and the current density for the solid electrolyte fuel cell of Experimental Embodiment 1 of the present invention.
Figure 12:
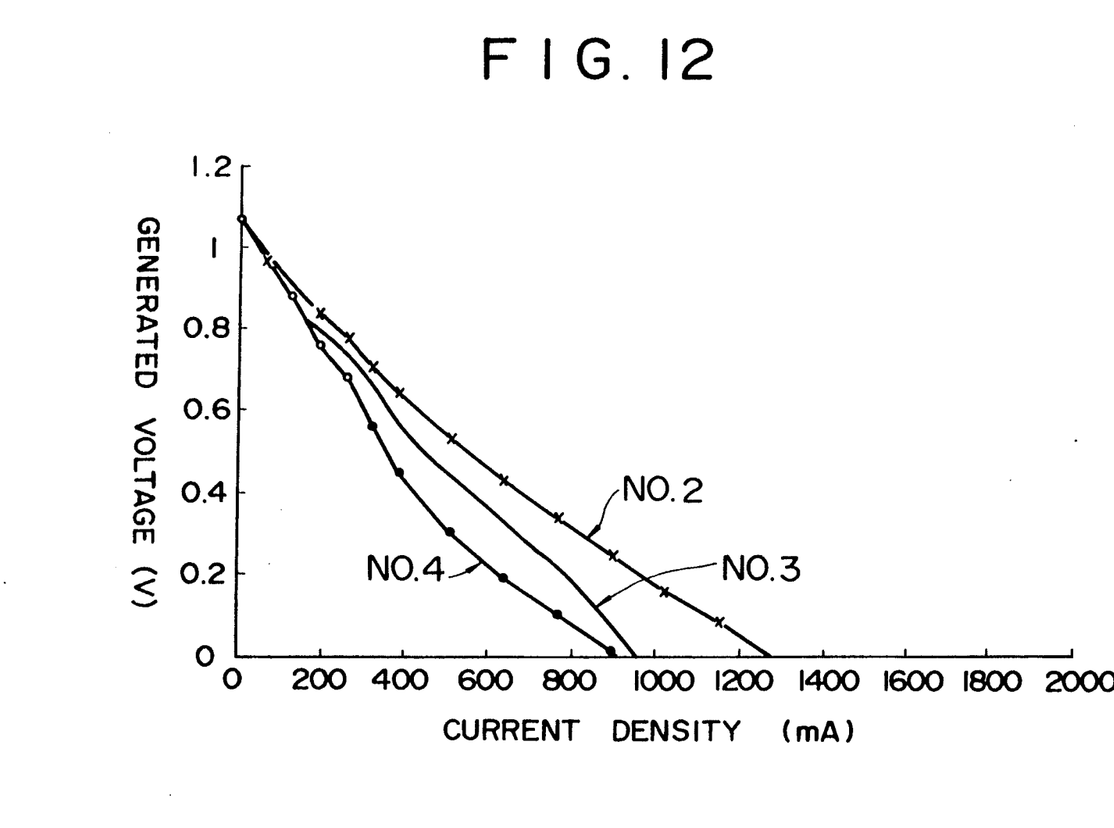
FIG. 12 shows the relation between the generated voltage and the current density for the solid electrolyte fuel cell of Comparative Example 1.
Figure 14:
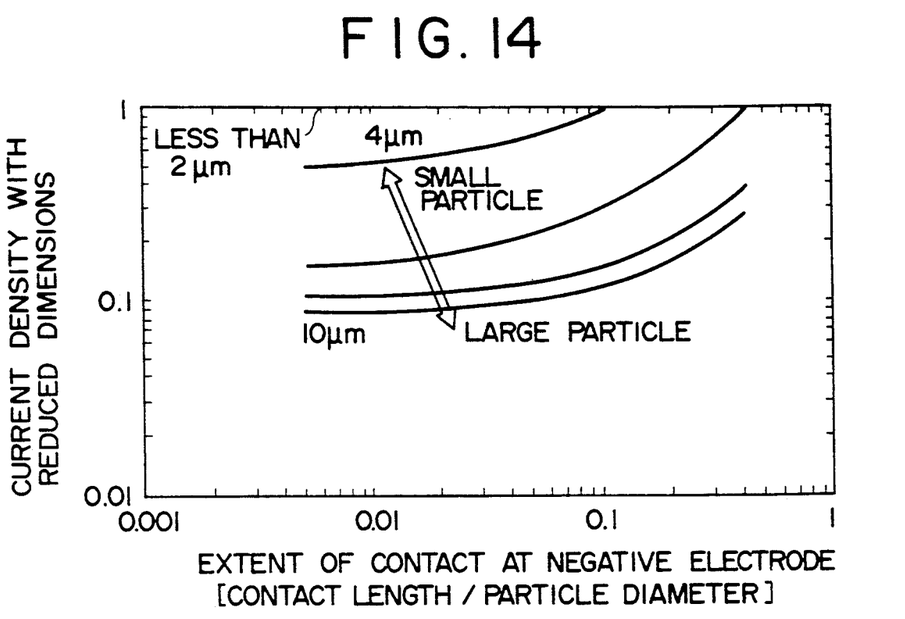
FIG. 14 shows the effect of the negative pole thin layer of the present invention.
Figure 15:
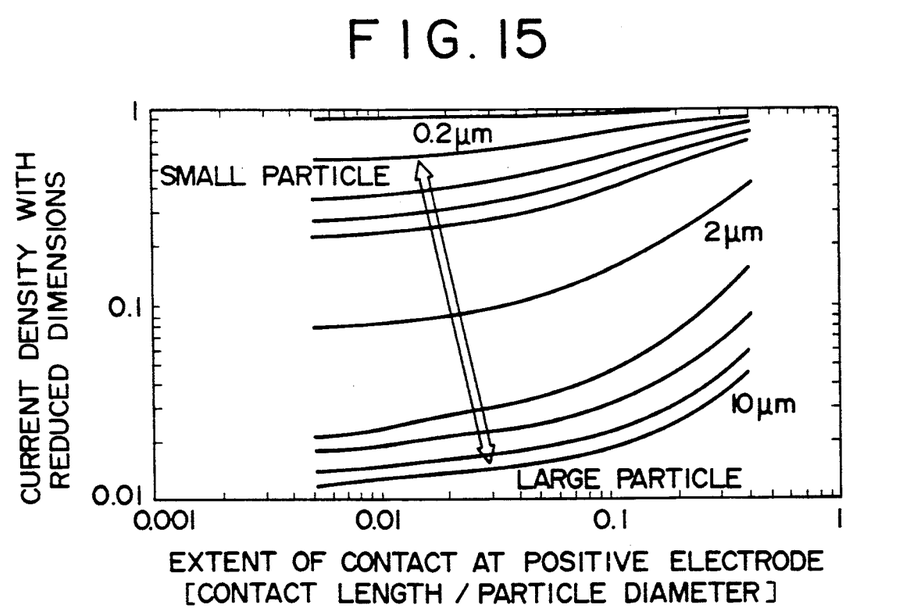
FIG. 15 shows the effect of the positive pole thin layer of the present invention.

A LaMnO$_3$ slurry which was mixed with Sr of 0.3 $\mu$m diameter was applied on a yttria stabilized zirconia plate of 23 mm in diameter and 200 $\mu$m in thickness to form the positive pole thin layer (less than 5 $\mu$m in particle diameter) 205, and then a slurry of the same material of 5 $\mu$m diameter was applied to form the oxygen electrode (thick film portion with the particle diameter of about 2-10 $\mu$m) 202. It was baked to obtain the oxygen electrode of 50 $\mu$m in thickness. Also, the fuel electrode (negative) was prepared to have the thick film portion of 50 $\mu$m in thickness using 3 $\mu$m NiO. $H_2$ and air were supplied to this cell at 1000° C., and current-voltage characteristics were measured to find the generated voltage as a function of the current density as shown in FIG. 11 (No. 1). Also, FIG. 14 is a characteristic graph showing the effect of the negative pole thin layer of the present invention. FIG. 15 is another characteristic graph showing the effect of the positive pole thin layer of the present invention. The vertical axis indicates the current density with reduced dimensions, and the horizontal axis indicates the extent of the contact between electrode particles (at the positive or negative pole) and the solid electrolyte. From these graphs, it can be seen that while if the particle diameter is smaller, the performance improves at any of the electrodes, particle diameters which are less than 1.0 $\mu$m, less than 0.4 $\mu$m preferably, at the positive pole, and less than 4 $\mu$m, less than 2 $\mu$m preferably, at the negative pole are desired.

Comparative Example 1

The data shown in FIG. 11 were obtained using 5 $\mu$m MnO$_3$ according to a conventional method. Three experiments (Nos. 2 to 4) were carried out to find performances which are less than a half as good as the present invention.

Experimental Embodiment 2

Figure 13:
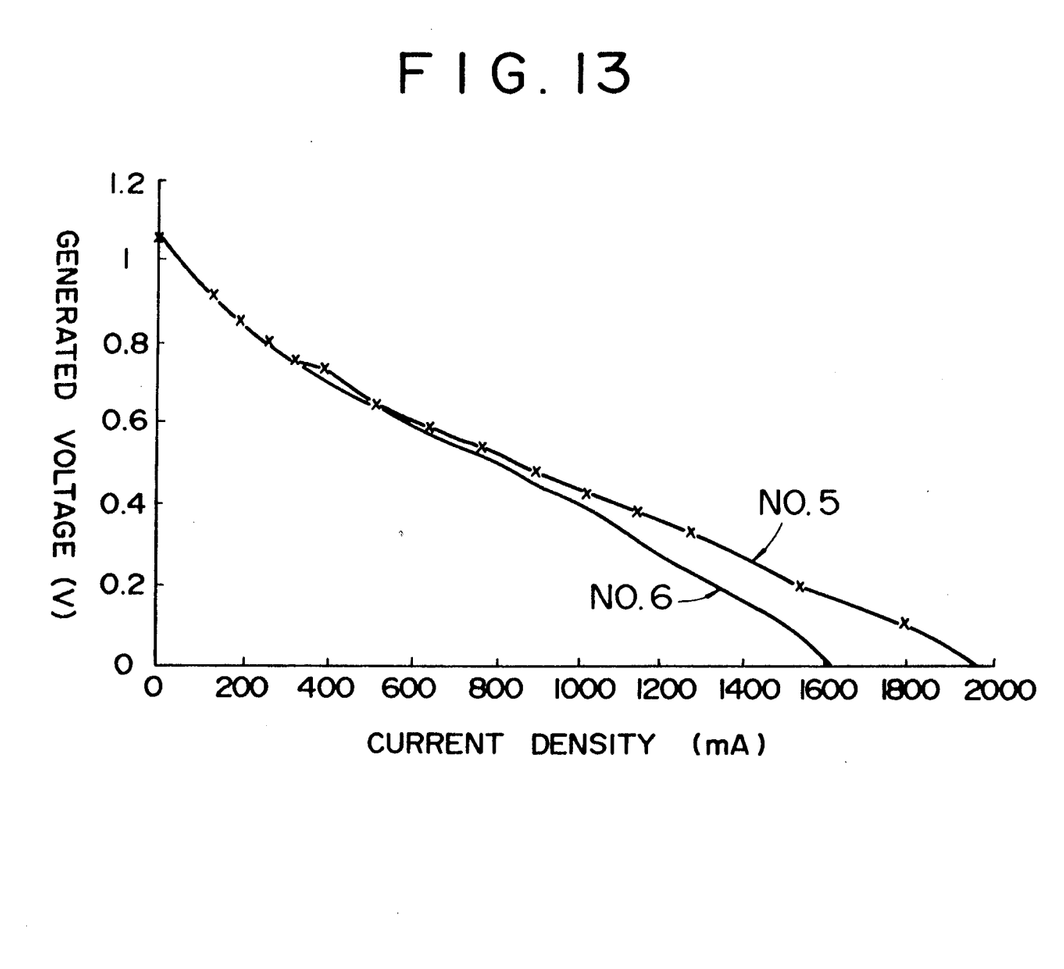
FIG. 13 shows the relation between the generated voltage and the current density for the solid electrolyte fuel cell of Experimental Embodiment 2 of the present invention.

As the positive pole thin layer 205, nonelectrolytic plating of platinum (with the layer thickness being about 0.3 to 0.4 $\mu$m) was used. FIG. 13 shows two runs for the generated voltage vs the current density (Nos. 5 and 6). Any of these runs shows good results.

Although the thin layer was formed on both sides of the electrolyte as shown in FIG. 8 in the above experimental embodiments, it can be formed on one major surface of the electrolyte only. Also, the thin layer can be as thin as the thickness of one particle.

As described above, according to the present invention, the formation of a thin layer of fine particles in contact with the solid electrolyte on the oxygen electrode side or on the fuel electrode side makes the diffusion of gas better and increases the effective contact area between the electrode particles and the solid electrode. Thus a solid electrolyte fuel cell with improved powder generation characteristics and reliability can be provided.

We claim:

1. A solid electrolyte fuel cell comprising a generating layer, an interconnector layer, and a support layer disposed between the generating layer and the interconnector layer wherein:
    the generating layer comprises a solid electrolyte sandwiched between a fuel electrode and an oxygen electrode;
    the interconnector layer comprises a fuel electrode and an interconnector material and an oxygen electrode;
    the support layer forms a fuel passage and an oxidizer passage above and below the generating layer; and
    supporting rods for gas sealing are disposed at both ends of the support layer.

2. The solid electrolyte fuel cell as claimed in claim 1, wherein a sealing film is cemented to contact surfaces of the supporting rods between connection portions of the generating layer and the interconnector layer, and the sealing film becomes soft during the operation of the fuel cell.

3. The solid electrolyte fuel cell as claimed in claim 2, wherein the sealing film is made and formed of a mixture of inorganic fiber which does not becomes soft even at 1000° C. and inorganic softening powder which become soft at about 1000° C.

4. The solid electrolyte fuel cell as claimed in claim 1, wherein the supporting rods are made of an electrolytic material.

5. A solid electrolyte fuel cell, comprising a solid electrolyte, a thin layer in direct contact with the solid electrolyte and comprised of at least one layer of oxygen electrode fine particles, an oxygen electrode placed on the thin layer and comprising a layer having a thickness greater than the thin layer and made of oxygen electrode particles having diameters larger than that of the oxygen electrode fine particles, and a fuel electrode disposed on the main surface of the solid electrolyte opposite from the oxygen electrode.

6. A solid electrolyte fuel cell, comprising a solid electrolyte, a first thin layer in direct contact with the solid electrolyte and comprised of at least one layer of oxygen electrode fine particles, an oxygen electrode placed on the first thin layer and comprising a layer having a thickness greater than the first thin layer and made of oxygen electrode particles whose diameters are larger than that of the oxygen electrode fine particles, a second thin layer in direct contact with the solid electrolyte on the opposite side from the first thin layer and comprised of at least one layer of fuel electrode fine particles, and a fuel electrode placed on the second thin layer and comprising a layer having a thickness greater than the second thin layer and made of fuel electrode particles having diameters larger than that of the fuel electrode fine particles.

7. The solid electrolyte fuel cell as claimed in claim 1, wherein the generating layer comprises a solid electrolyte, a thin layer in direct contact with the solid electrolyte and comprised of at least one layer of oxygen electrode fine particles, an oxygen electrode placed on the thin layer and comprising a layer having a thickness greater than the thin layer and made of oxygen electrode particles having diameters larger than that of the oxygen electrode fine particles, and a fuel electrode disposed on the main surface of the solid electrolyte opposite from the oxygen electrode.

8. The solid electrolyte fuel cell as claimed in claim 1, wherein the generating layer comprises a solid electrolyte, a thin layer in direct contact with the solid electrolyte and comprised of at least one layer of fuel electrode fine particles, a fuel electrode placed on the thin layer and comprising a layer having a thickness greater than the thin layer and made of fuel electrode particles having diameters larger than that of the fuel electrode fine particles, and an oxygen electrode disposed on the main surface of the solid electrolyte opposite from the fuel electrode.

9. The solid electrolyte fuel cell as claimed in claim 1, wherein the generating layer comprises a solid electrolyte, a first thin layer in direct contact with the solid electrolyte and comprised of at least one layer of oxygen electrode fine particles, an oxygen electrode placed on the first thin layer and comprising a layer having a thickness greater than the first thin layer and made of oxygen electrode particles having diameters larger than that of the oxygen electrode fine particles, a second thin layer in direct contact with the solid electrolyte on the opposite side from the first thin layer and comprised of at least one layer of fuel electrode fine particles, and a fuel electrode placed on the second thin layer and comprising a layer having a thickness greater than the second thin layer and made of fuel electrode particles having diameters larger than that of the fuel electrode fine particles.

10. The solid electrolyte fuel cell as claimed in claim 1, wherein a sealing film is cemented to contact surface of the supporting rods between connection portions of the generating layer and the interconnector layer, and the sealing film becomes half melted during the operation of the fuel cell.

11. The solid electrolyte fuel cell as claimed in claim 2, wherein the sealing film is made and formed of a mixture of inorganic fiber which does not become soft even at 1000° C. and inorganic softening powder which becomes half melted at about 1000° C.

12. The solid electrolyte fuel cell as claimed in claim 3, wherein the supporting rods are made of an electrolytic material.

13. The solid electrolyte fuel cell as claimed in claim 12, wherein the generating layer comprises a solid electrolyte, a thin layer in direct contact with the solid electrolyte and comprised of at least one layer of oxygen electrode fine particles, an oxygen electrode placed on the thin layer and comprising a layer having a thickness greater than the thin layer and made of oxygen electrode particles having diameters larger than that of the oxygen electrode fine particles, and a fuel electrode disposed on the main surface of the solid electrolyte opposite from the oxygen electrode.

14. The solid electrolyte fuel cell as claimed in claim 12, wherein the generating layer comprises a solid electrolyte, a thin layer in direct contact with the solid electrolyte and comprised of at least one layer of fuel electrode fine particles, a fuel electrode placed on the thin layer and comprising a layer having a thickness greater than the thin layer and made of fuel electrode particles having diameters larger than that of the fuel electrode fine particles, and an oxygen electrode disposed on the main surface of the solid electrolyte opposite from the fuel electrode.

15. The solid electrolyte fuel cell as claimed in claim 12, wherein the generating layer comprises a solid electrolyte, a first thin layer in direct contact with the solid electrolyte and comprised of at least one layer of oxygen electrode fine particles, an oxygen electrode placed on the first thin layer and comprising a layer having a thickness greater than the first thin layer and made of oxygen electrode particles having diameters larger than that of the oxygen electrode fine particles, a second thin layer in direct contact with the solid electrolyte on the opposite side from the first thin layer and comprised of at least one layer of fuel electrode fine particles, and a fuel electrode placed on the second thin layer and comprising a layer having a thickness greater than the second thin layer and made of fuel electrode particles having diameters larger than that of the fuel electrode fine particles.

16. The solid electrolyte fuel cell as claimed in claim 4, wherein a sealing film is cemented to contact surfaces of the supporting rods between connection portions of the generating layer and the interconnector layer, and the sealing film becomes half melted during the operation of the fuel cell.

17. The solid electrolyte fuel cell as claimed in claim 4, wherein the sealing film is made and formed of a mixture of inorganic fiber which does not become soft even at 1000° C. and inorganic softening powder which becomes half melted at about 1000° C.

18. The solid electrolyte fuel cell as claimed in claim 13, wherein the sealing film is made and formed of a mixture of inorganic fiber which does not become soft even at 1000° C. and inorganic softening powder which becomes half melted at about 1000° C.

19. The solid electrolyte fuel cell as claimed in claim 15, wherein the sealing film is made and formed of a mixture of inorganic fiber which does not become soft even at 1000° C. and inorganic softening powder which becomes half melted at about 1000° C.

* * * * *